United States Patent [19]

Almgren et al.

[11] 4,388,964
[45] Jun. 21, 1983

[54] THERMAL CONTROL SYSTEM

[75] Inventors: David W. Almgren, Concord; John T. Bartoszek, Bolton; Robert M. Lucas, Melrose; Richard P. Berthiaume; Richard H. Spencer, both of Winchester; William H. Saia, Danvers, all of Mass.

[73] Assignee: Arthur D. Little, Inc., Cambridge, Mass.

[21] Appl. No.: 83,972

[22] Filed: Oct. 11, 1979

[51] Int. Cl.³ .................................... G05D 23/00
[52] U.S. Cl. .................................. 165/32; 165/35; 165/97; 165/103; 165/104.31; 417/373
[58] Field of Search .................. 165/32, 39, 41, 96, 165/40, 104.31, 103; 417/373

[56] References Cited

U.S. PATENT DOCUMENTS

| | | | |
|---|---|---|---|
| 2,950,093 | 8/1960 | Krempel et al. | 165/107 |
| 3,042,352 | 7/1962 | Stamper | 248/68 |
| 3,286,954 | 11/1966 | Swet | 244/1 |
| 3,394,659 | 7/1968 | Van Alen | 417/373 |
| 3,486,995 | 2/1970 | Rosen et al. | 165/46 |
| 3,490,718 | 1/1970 | Vary | 244/163 |
| 3,545,892 | 12/1970 | Zimmermann | 417/373 |
| 3,608,818 | 9/1971 | Fellenberg | 237/63 |
| 3,776,305 | 12/1973 | Simmons | 165/107 |
| 3,965,971 | 6/1976 | Roggenkamp | 165/39 |
| 4,127,105 | 11/1978 | Watt | 165/105 |
| 4,161,212 | 7/1979 | Hightower | 165/96 |
| 4,162,701 | 7/1979 | Ollendorf | 165/32 |

OTHER PUBLICATIONS

Proceedings of Spacecraft Thermal and Environmental Control Systems Symposium, Almgren et al, Munich, Oct. 10–12, 1979 (ESASP-139, Nov. 1978).
"Radiator Heat Rejection Options for Shuttle Payloads", ASME publication 79-ENAs-18.
*DC Motors Speed Controls Servo Systems*, Electro-Craft Corporation, pp. 3–20 and 3–27.

*Primary Examiner*—Samuel Scott
*Assistant Examiner*—Margaret A. Focarino
*Attorney, Agent, or Firm*—Hamilton, Brook, Smith and Reynolds

[57] ABSTRACT

In a space shuttle, payloads are individually temperature controlled by means of a liquid control loop in heat exchange relationship with both the payload and a radiator or shuttle cold plate. The liquid pump is driven at a variable speed to control the heat transferred between the load and the radiator or cold plate, and the motor may be reversed to by-pass the radiator through check valves. The radiator includes heat pipes seated in elongated, high thermal conductivity extrusions and retained therein by elongated springs. The motor is a brushless DC motor isolated from the pump by a magnetic clutch and thermal isolator. The motor is driven by a digital circuit which provides a single pulse to each set of windings during each energizing time frame. The width of that pulse is modulated to provide for speed control. Pulse width modulation is by means of a one-shot, the pulse duration of which is controlled by a speed control signal.

33 Claims, 19 Drawing Figures

THERMAL CONTROL SYSTEM

DESCRIPTION

1. Technical Field

This invention relates to systems for controlling the temperature of a load by heat transfer to a liquid coolant and has particular application to temperature control of payloads on a space shuttle.

2. Background Art

Figures 1, 2:
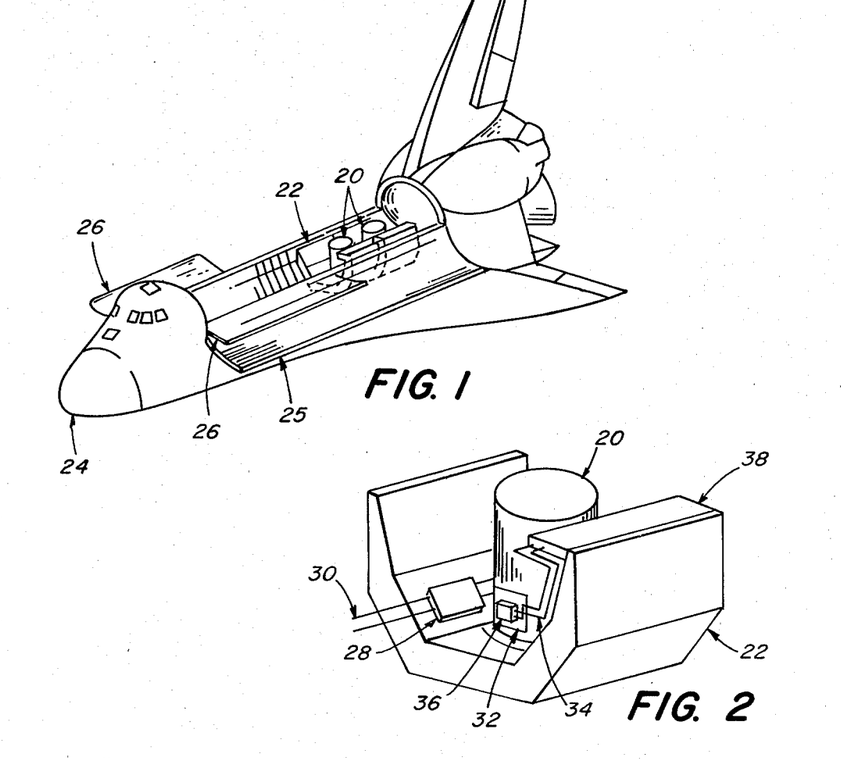
FIG. 1 is a perspective view of a space shuttle in orbit with its cargo bay doors open.
FIG. 2 is an enlarged view of a single palletmounted payload within the space shuttle cargo bay and embodying a thermal control system of this invention.

The space shuttle presently being developed is intended to carry commercial, scientific and other types of payloads into orbit on each of many orbital missions. Various commercial or research groups may, for example, be allocated space on the shuttle to send their instrumentation into orbit where various tests can be made. As shown in FIG. 1, an instrument payload 20 could be mounted on a pallet 22 carried in the cargo bay of the shuttle 24. Once the shuttle reaches orbit, the bay doors 25 will be opened to expose the instrumentation to the space environment so that the tests may be run.

The temperature-sensitive instrumentation may at times be exposed to the extreme heat from direct sunlight and at other times to the cold of dark space. Maintaining the temperature of the instrumentation within proper ranges becomes a complicated problem. To reject heat to space, radiators 26 have been included as part of the space shuttle. These radiators, located on the interior side of the cargo bay doors, will be exposed to space when the doors are opened. Heat collected by a liquid flow loop through the shuttle will be directed to those radiators which then emit the heat into space. To that end, each pallet 22 could have one or more cold plates 28 (FIG. 2) mounted thereto and in a heat exchange relationship with a fluid line 30. The line 30 would carry a liquid freon coolant or other fluid that would exchange heat with a loop running to the shuttle radiators 26. Each instrument payload might then be in thermal contact with a cold plate to discharge heat from the payload. Because several payloads can reject heat to the same thermal control loop, the thermal control of an individual payload to within specified temperature limits could become complicated. For each mission, the fluid loop and payload thermal interactions must be reanalyzed using complex computer calculations.

To avoid the complications in thermal design which result from a thermal control loop servicing all payloads, it has been suggested by Stanford Ollendorf in U.S. Pat. No. 4,162,701, that some payloads be mounted in a thermal control canister. The canister has variable conductance heat pipes mounted to several radiating surfaces. The variable conductance heat pipes vary the heat transfer characteristics between the payload and the radiator panels to maintain the load within some predetermined temperature range. Such a system avoids the need for use of the common shuttle radiator but does suffer several drawbacks. The positioning of the canister may not always correspond to the preferred positioning of its heat rejection radiators. Further, because the radiators are positioned so as to view the cargo bay they are subject to heat emissions and reflections from other payloads. This may require a detailed flux analysis to determine the maximum heat rejection capability of the thermal control canister. A primary disadvantage of the Ollendorf system is the high fabrication cost.

An object of this invention is to provide a low cost temperature control system suitable for use in systems such as the space shuttle. A further object of the invention is to provide such a system which is readily adapted for use with a wide variety of payloads and which may even be used with different payloads on successive space missions without the need for a complex thermal analysis.

DISCLOSURE OF THE INVENTION

In accordance with the invention as it applies to use in a space shuttle, a dedicated radiator, which is exposed to space when the bay doors are opened, could be mounted to the pallet, for example near the sill of the pallet, or on an individual payload. The radiator is in heat exchange relationship with the payload through a liquid temperature control loop.

In accordance with the invention as it applies to the shuttle and other applications, a dedicated liquid thermal control loop is in heat exchange relationship with both the payload and a heat source or sink. The liquid in the control loop is driven by a variable speed pump to control the amount of heat transfer between the payload and the heat source or sink.

In accordance with detailed aspects of the invention, the direction of rotation of the liquid pump is reversible. When the pump is reversed, check valves associated with the heat sink or source cause that heat sink or source to be bypassed by the temperature control liquid. A minimum flow is maintained in both the forward and reverse directions of the pump in order to prevent freezing of the flowing liquid. Heat may be then be applied, if necessary, at one location in the liquid loop system.

In the event that freeze up of the coolant does occur, resulting in a blockage in the liquid system, a magnetic coupling between the drive motor and liquid pump prevents burnout of the motor. The motor and pump are also separated by a thermal isolator so that the motor and electronics are not affected by the possibly very low temperatures of the heat transfer liquid.

The preferred radiator in the system includes several heat pipes which extend the length of a honeycomb-type radiator panel. For easy replacement of individual heat pipes, each is seated in an elongated, high conductivity extrusion and is clamped into its seat by an elongated spring clamp.

BRIEF DESCRIPTION OF THE DRAWINGS

The foregoing and other objects, features and advantages of the invention will be apparent from the following more particular description of preferred embodiments of the invention, as illustrated by the accompanying drawings in which like reference characters refer to the same parts throughout the different views. The drawings are not necessarily to scale, emphasis instead being placed upon illustrating the principles of the invention.

PREFERRED MODE OF CARRYING OUT THE INVENTION

Figure 3:
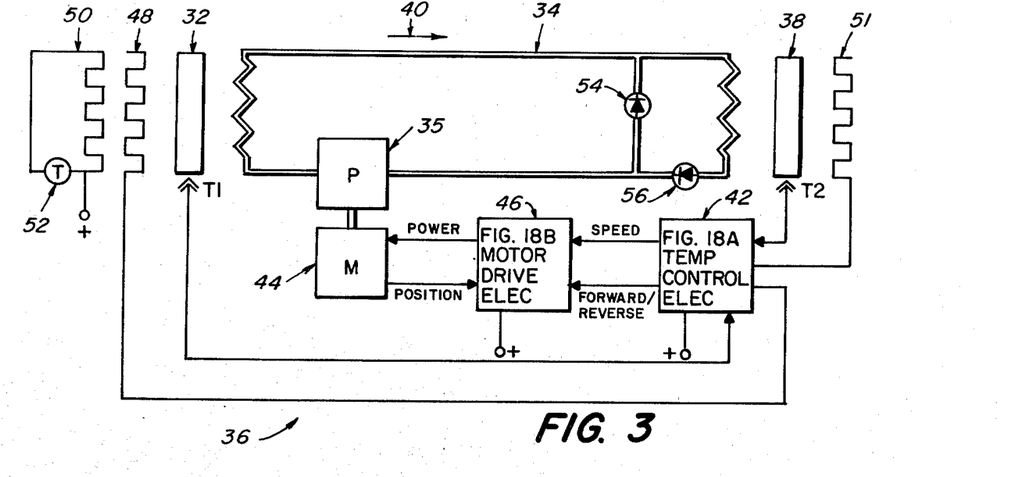
FIG. 3 is a schematic block diagram of a thermal control system embodying this invention.

As illustrated in FIGS. 2 and 3, the preferred temperature control system for the insulated payload 20 includes an aluminum cold plate 32 mounted to that payload and in heat transfer relationship with a liquid coolant in an insulated fluid loop 34. A coolant such as Freon 11 liquid in that line 34 is driven by a pump 35 in module 36. The liquid passes in heat exchange relationship with heat pipes mounted below a radiator 38 which is in turn supported on the pallet 22. The radiator 38 is readily positioned for efficient heat emission into space.

The pump 35 is a variable speed and reversible pump. By varying the speed in the forward direction indicated by arrow 40, the mass flow of the heatcarrying liquid can be varied to set the level of heat transfer between the cold plate 32 and radiator 38. The control electronics 42 respond to temperature sensing thermistor T1 on the cold plate 32 or elsewhere to adjust the speed of the pump drive motor 44 by an appropriate signal to the motor drive electronics 46.

The temperature control system operates to maintain the temperature of the cold plate 32 in a predetermined range of a selected set point temperatures. For example, set point temperatures of 0° C., 10° C., 20° C., 30° C. or 40° C. may be selected by the user. With the liquid pump operating in the forward direction, its speed can be varied between minimum and maximum speeds to vary the heat transfer between the cold plate and the radiator. If the temperature at thermistor T1 is below the set point, the speed of the pump is reduced; and if the temperature is above the set point, the speed is increased.

Even if the temperature of the thermistor T1 continues to drop, the pump does not operate below a minimum speed. By maintaining the minimum liquid flow the likelihood of the line freezing is reduced. If the pump is operating at minimum speed in the forward direction and the cold plate becomes even colder than a selected reversing temperature, the liquid pump is reversed. In reverse it is operated at that same minimum speed. With the liquid flow in the direction opposite to arrow 40, the check valve 56 blocks flow of the liquid past the radiator 38 and the liquid is bypassed through a check valve 54.

Figures 4, 5:
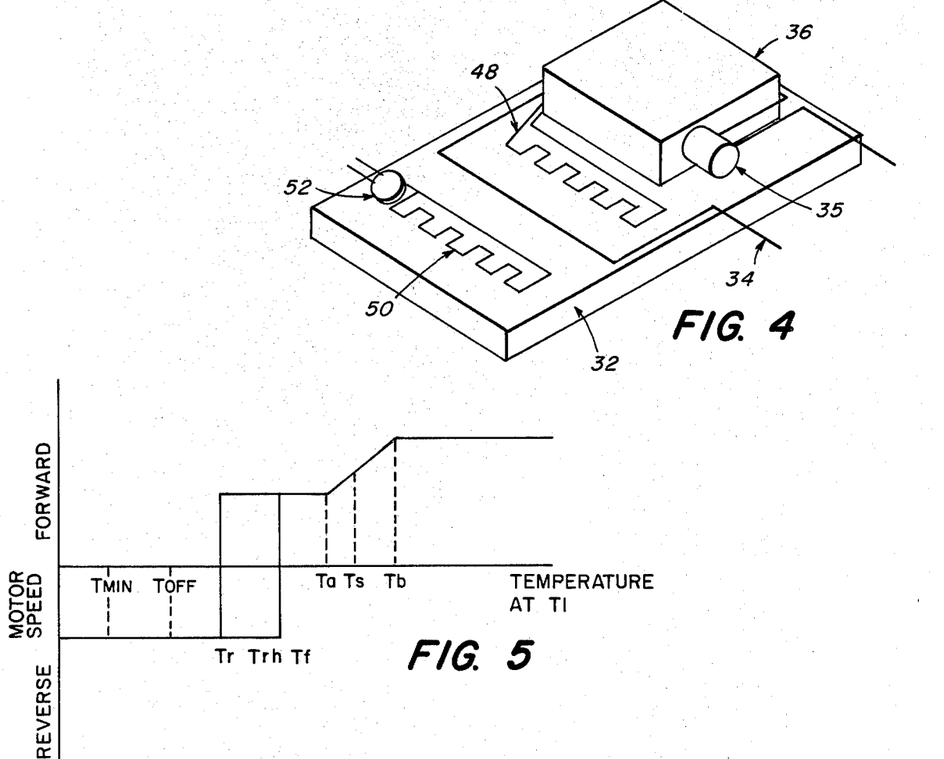
FIG. 4 is a perspective view of the liquid pump and electronics package mounted to a cold plate in a system of FIGS. 1-3.
FIG. 5 is a graphical illustration of the contolled pump speed as related to payload temperature in the system.

When the cargo bay is facing deep space, the cargo bay environment can become very cold. In that case, it may be necessary to add heat to the payload to maintain its temperature within a predetermined range. To that end, as shown in FIG. 4, foil resistance heaters 48 and 50 are positioned on the cold plate 32 along with the pump-and-electronics module 36. When the temperature of the cold plate, sensed by thermistor T1, drops to some predetermined temperature level the heater 48 is turned on. That temperature level is below the pump reversing temperature so that heat from heater 48 is not lost through the radiator 38. Even if the control electronics 42 is switched off, a fail-safe heater 50 is turned on by a thermostat 52 at, for example, −30° C. if electrical power is available.

The above operation of the pump in the control system is illustrated in FIG. 5. The motor is controlled to maintain the temperature of the plate 32 within a predetermined upper and lower range about the selected temperature set point $T_s$. If the temperature of the cold plate is greater than the temperature $T_b$, the pump is run at maximum forward speed to provide maximum cooling. When the temperature is below that temperature $T_b$ but above a temperature $T_a$, the speed of the pump is varied such that the temperature of the plate 32 tends to move toward the set point temperature $T_s$. In order to prevent freeze up of the coolant, a minimum forward speed is maintained below temperature $T_a$. If, however, the temperature of the plate becomes less than a temperature $T_r$, the motor is reversed at the minimum speed. If, even with the radiator bypassed by the reversed flow, the temperature of the payload continues to drop below $T_r$ to a temperature $T_{min}$, the heater 48 is turned on. This heater 48 provides sufficient heat input to hold the plate 32 at a minimum temperature even at extremely low environmental temperatures. In order to prevent unstable control of the heater at the temperature $T_{min}$, the heater is held on even as the temperature of the plate increases until that temperature reaches $T_{off}$. If, with the heater off the plate cools back down, the heater would not come on again until the temperature reached $T_{min}$.

If the temperature of the payload increases again beyond the temperature $T_r$ to a temperature $T_f$, the pump is again switched to the forward direction to provide liquid flow at the radiator. Hysteresis is provided between temperatures $T_r$ and $T_f$ in order to prevent unstable motor control at the reversing temperature.

When the motor is in reverse, the environment can be extremely cold and, with no liquid flow in the radiator, the heat transistor fluid in the heat pipes may freeze. Even if the fluid does not freeze, the efficiency of the heat pipe decreases with decreasing temperature. The heater 51 is provided along the length of the radiator in order to warm the heat pipes prior to switching of the radiator back into the control loop. To avoid wasting power to the heater, the heater is not switched on unless temperature controller anticipates that the pump will switch to the forward direction to include the radiator in the liquid loop and the temperature of the radiator is less than a predetermined temperature $T_{rad}$. To that end, radiator heater 51 is set to energize at a temperature $T_{rh}$ between temperatures $T_r$ and $T_f$ only if the pump is operating in the reverse direction and the temperature of the radiator is less than $T_{rad}$. With ammonia filled heat pipes, a preferred temperature $T_{rad}$ is $-60°$ C.

Figure 6:
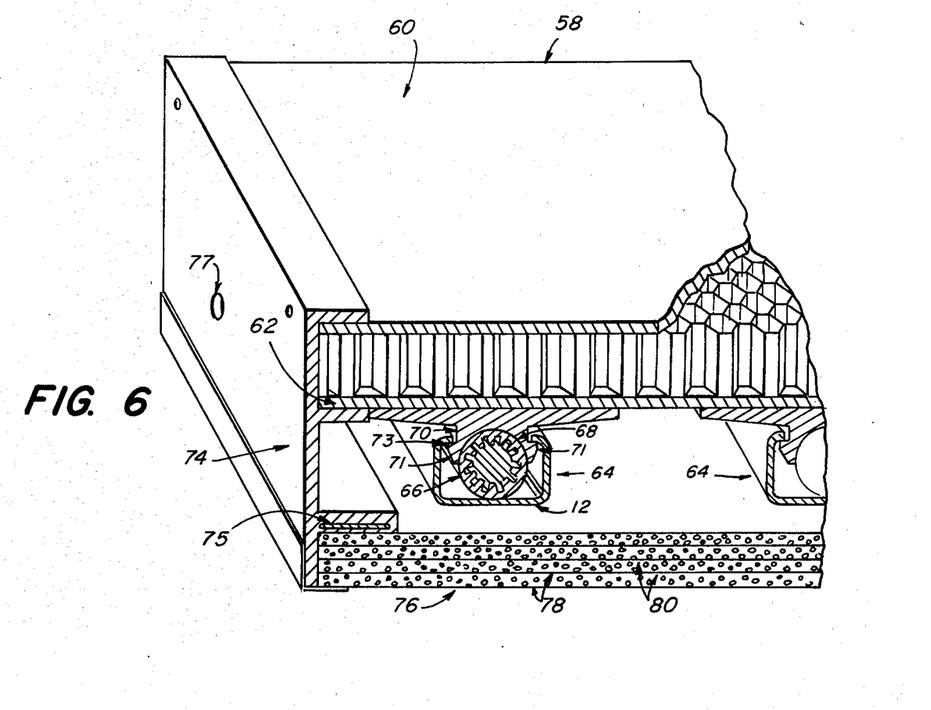
FIG. 6 is an isometric sectional view of a preferred radiator for use in the system.
Figures 7, 8:
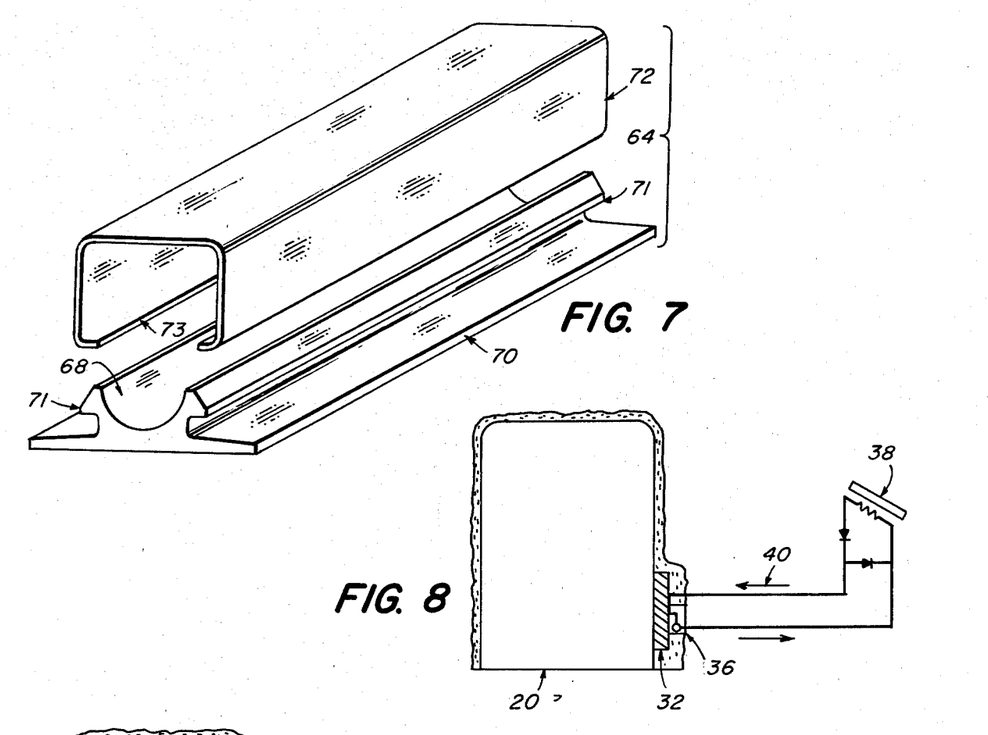
FIG. 7 is a perspective view of a heat pipe fixture including an extrusion and clamping spring.
FIG. 8 is a schematic of the thermal loop in the system of FIG. 2.

A preferred radiator is shown in FIGS. 6 and 7. The radiating element is a honeycomb panel 58. Its radiating surface 60 is coated with a low solar absorptance and high infrared emittance coating such as silverized polytetrafluoroethylene (sold under the trademark Teflon) or white paint. An underlying aluminum layer 62 is in heat exchange contact with a heat pipe fixture 64. In that fixture, a heat pipe 66 is positioned in a semicylindrical seat 68 in an extruded aluminum base 70. The heat pipe 66 is held firmly in the seat 68 by an elongated stainless steel clamping spring 72. The clamping spring 72 has inwardly directed lips 73 which fit over ridges 71 of the base 70. The spring 72 is shown to be box-shaped, but other shapes may be selected to change the ease with which the spring can be fitted over the ridges 71 and to change the clamping force applied to the heat pipe.

The preferred heat pipes are conventional 12 mm diameter extruded aluminum pipes with internal axial grooves and filled with ammonia. The heat pipes are thermally bonded to the seat 68 by a thermal joint compound such as thermal grease or RTV60, a product of General Electric. The extruded base 70 and clamping spring 72 for the heat pipe fixture are shown enlarged and inverted in FIG. 7.

Several such heat pipe fixtures are spaced along the panel 58 and each extends the entire length of the panel. Supported below the heat pipes by edge mountings 74 is multi-layered insulation 76. The preferred insulation layers 78 are a fabric made of polyester fibers, such as sold under the trademark Dacron, and aluminum foil and are separated by low thermal conductivity spacers 80, such as polyurethane-polyester, flexible open-cell foam. This insulation is held to the edge mountings 74 and to the heat pipe assemblies 64 by fasteners 75 sold under the trademark Velcro. Vent holes 77 are provided in mountings 74 to release pressure differentials between the interior and exterior of the assembly.

Figure 9:
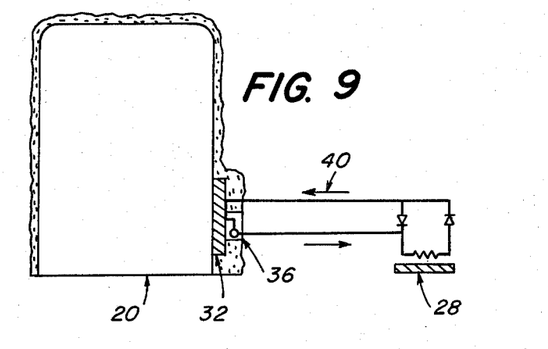
FIG. 9 is a schematic of an alternative system in which the shuttle-provided cold plate is the heat sink.
Figure 10:
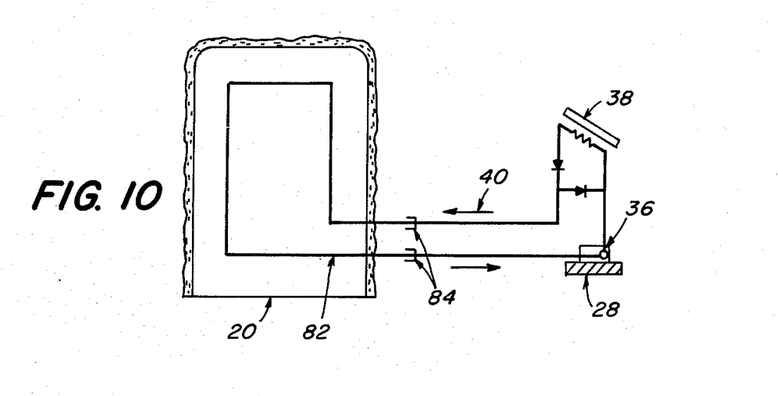
FIG. 10 is a schematic of another alternative system in which both the radiator and shuttle-provided cold plates are used as heat sinks and in which the liquid loop is coupled to a cooling loop within the payload.

The pump/electronics module can be utilized in thermal control systems on the shuttle in several system configurations, three of which are shown in FIGS. 8, 9 and 10. FIG. 8 is a schematic of the system of FIG. 2 and is provided for purposes of comparison. As already noted, the pump module 36 is mounted to a cold plate 32 on the payload 20. The pump circulates liquid to the radiator 38.

In the system of FIG. 9, the pump module 36 is mounted to the same cold plate 32 on the payload 20. However, in this case the heat sink is the shuttle-provided cold plate 28 rather than the radiator 38. This is not the preferred system because it does require interfacing with the shuttle-provided thermal control system.

In the system of FIG. 10, the motor module 36 is mounted to the shuttle-provided cold plate 28. The thermal control loop also includes the radiator 38. Rather than using a cold plate in the payload, the liquid flow loop is extended throughout the payload by an internal line 82. Connection is made to that internal loop by fluid line connectors 84.

Figure 11:
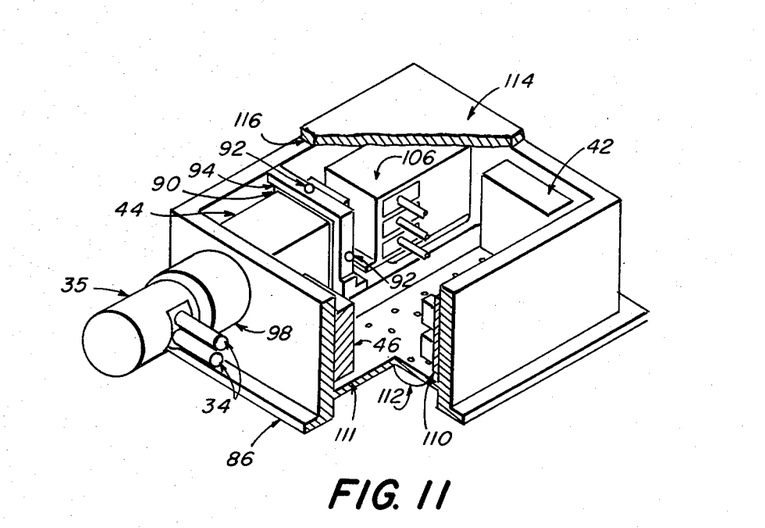
FIG. 11 is a perspective view, partially broken away, of the pump and electronics module.
Figure 12:
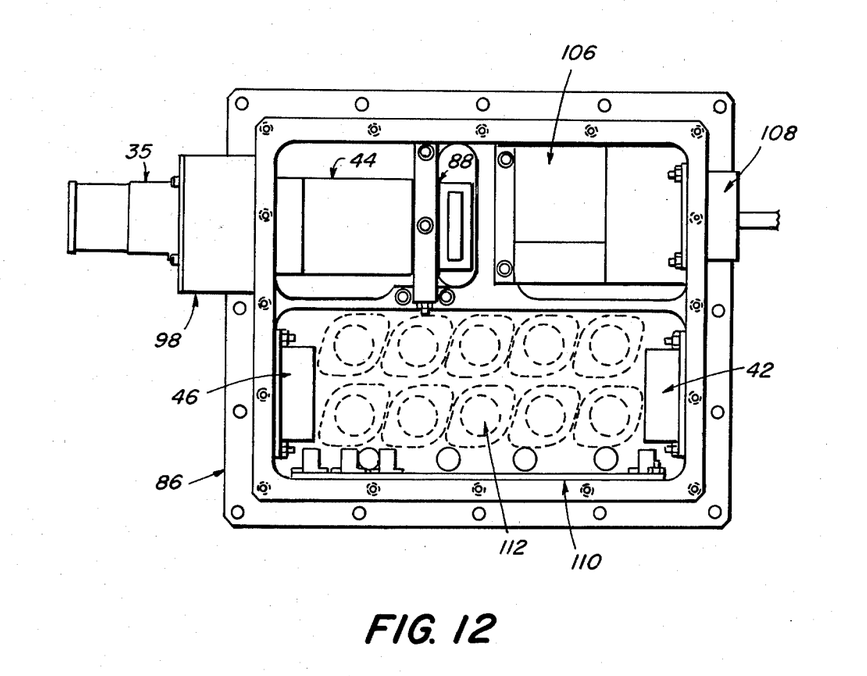
FIG. 12 is a plan view of the module of FIG. 11.
Figure 13:
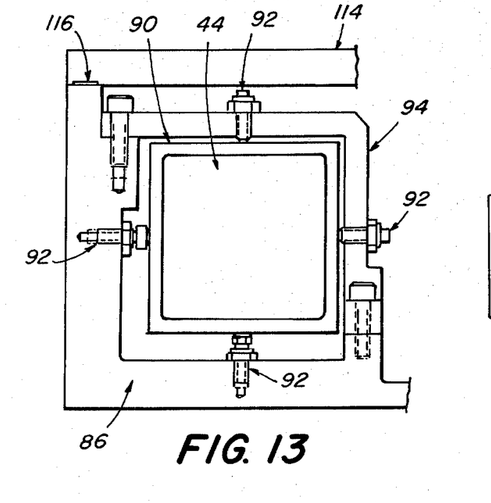
FIG. 13 is a partial sectional view of the motor mount shown in FIGS. 11 and 12 taken along line 13—13.

The layout of the pump and electronics module 36 is shown in FIGS. 11, 12, 13 and 14. The motor 44 and the electronics are encased in an aluminum casing 86. The motor 44 is bolted at one end to the casing. The other end of the motor is supported in a four point support structure. As shown in FIG. 13, the motor is surrounded by a collar 90 against which placement bolts 92 press. Two of the bolts 92 are held in place by an angle element 94 which is bolted to the casing 86.

Figure 14:
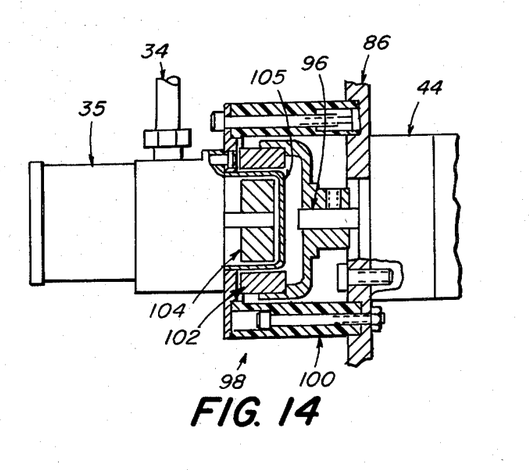
FIG. 14 is a partial sectional view of the magnetic coupling and thermal isolator unit of FIGS. 11 and 12.

The drive shaft 96 of the motor extends through a magnetic clutch and thermal isolator unit 98 to the pump 35. As shown in FIG. 14, the unit 98 includes a thermal isolator 100. The isolator minimizes excessive cooling of the motor and electronics and heating of the coolant when the liquid coolant in line 34 is cold. The magnetic coupling members 102 and 104 decouple the pump from motor with excessive loading of the motor. Thus, if the coolant in line 34 should freeze the motor 44 is released in order to prevent overheating of the motor. To re-engage the coupling, the motor can be stopped for an instant, or it can be reversed. A liquid sealing wall 105 is positioned between the coupling members 102 and 104 to preclude any leakage of coolant out of the driven end of the pump.

An electrical connector and electrical filter module 106 is positioned adjacent to the motor 44. An external electrical connector 108 extends from that module through the casing 86. The module provides an electrical filter element in all incoming and outgoing power leads to reduce electromagnetic interference to and from the system. The temperature controller 42 and motor controller electronics 46 are positioned at opposite ends of and adjacent to the interior surfaces of the casing 86.

A resistor board 110 extends along a side wall between the two controller modules. Power transistors 112 are positioned below a floor 111 and can be mounted from the opposite side of the casing 86. The open face of the casing is covered by a cover plate 114 with an RF gasket 116 between the cover plate and casing.

Figure 15:
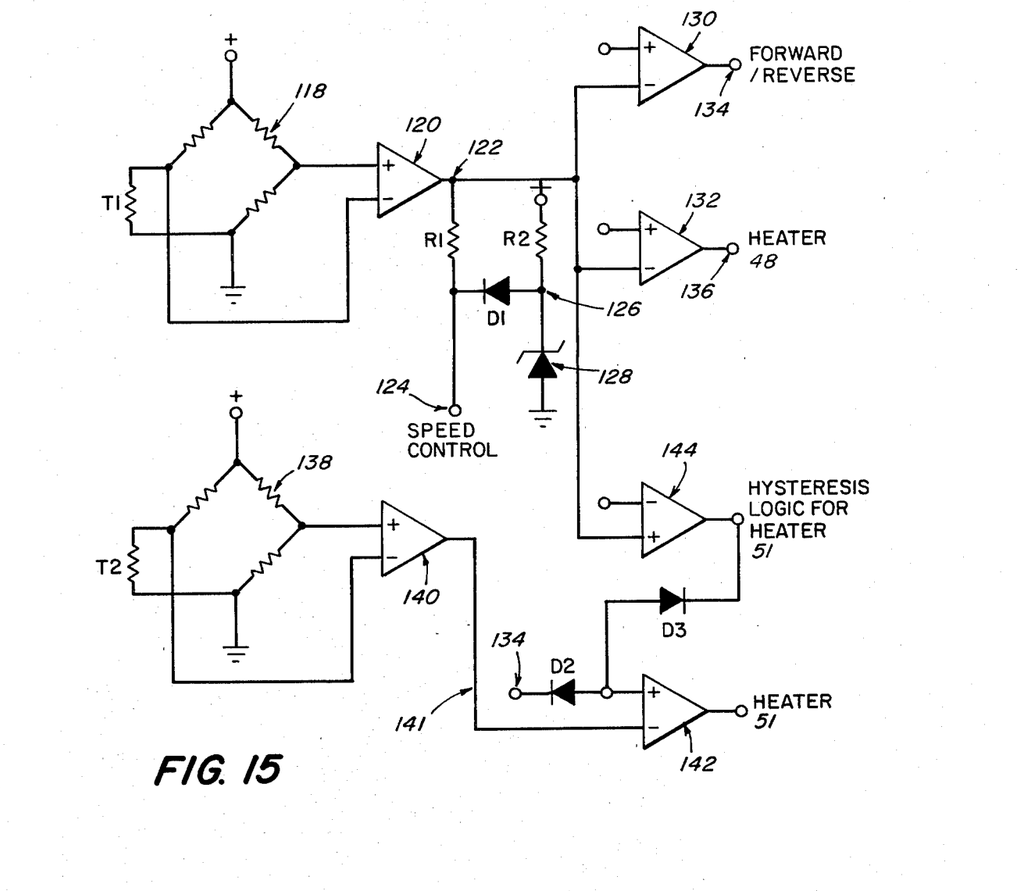
FIG. 15 is a simplified schematic of the temperature control electronics of FIG. 3.
Figure 16:
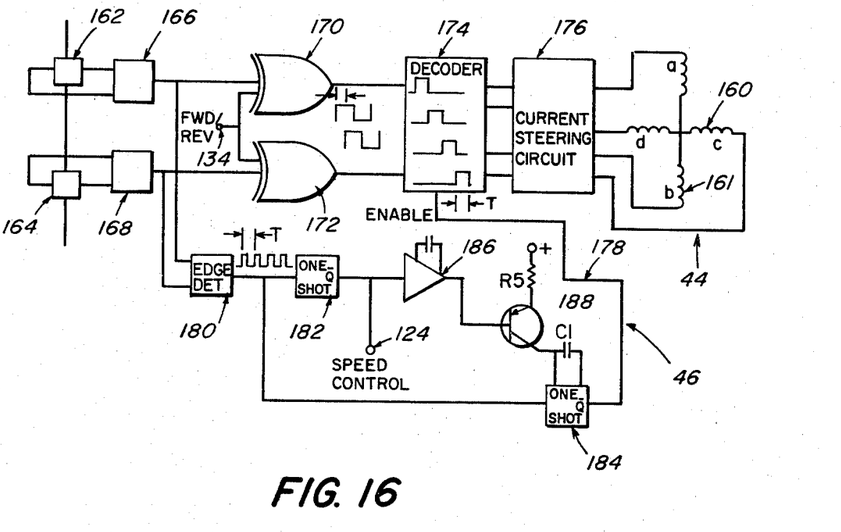
FIG. 16 is a simplified schematic of the motor drive electronics of FIG. 3.
Figure 18A:
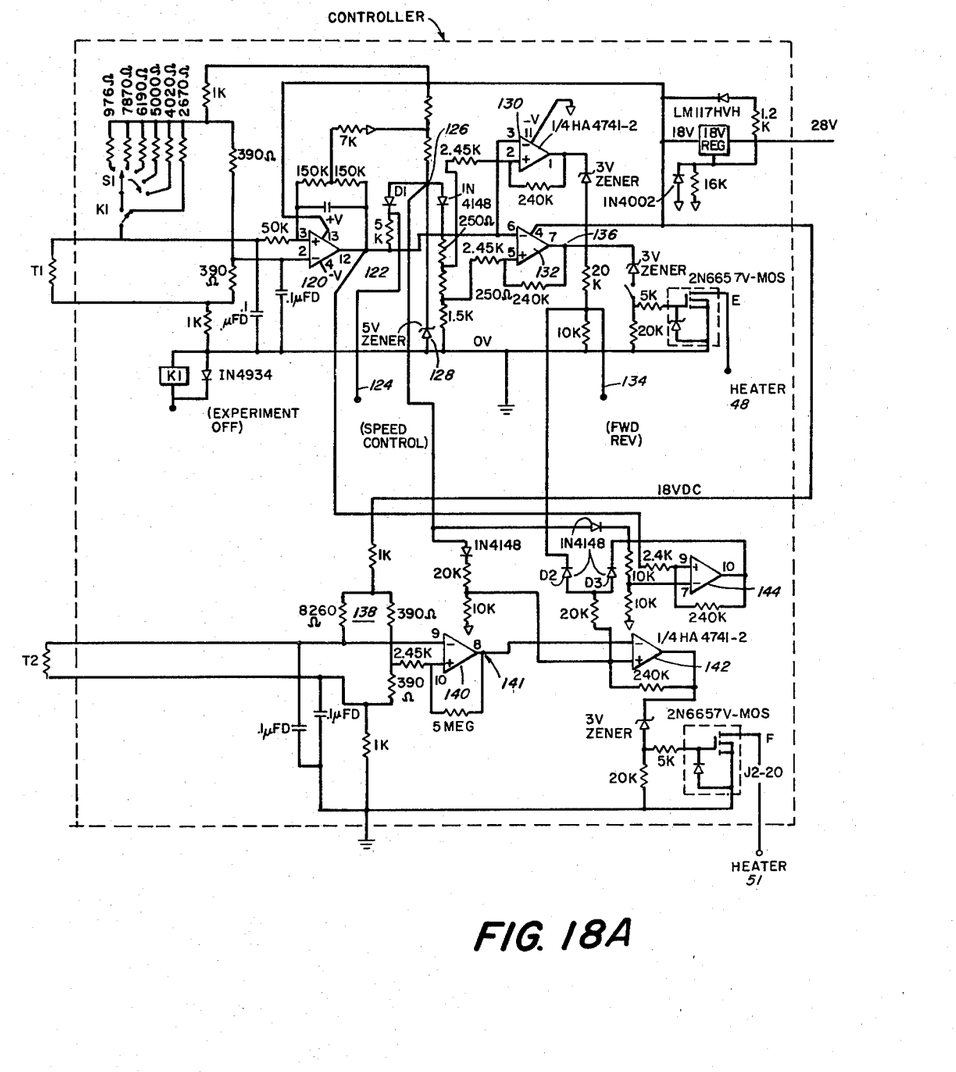
FIG. 18A and B is a more detailed schematics of the temperature control and motor drive electronics.
Figure 18B:
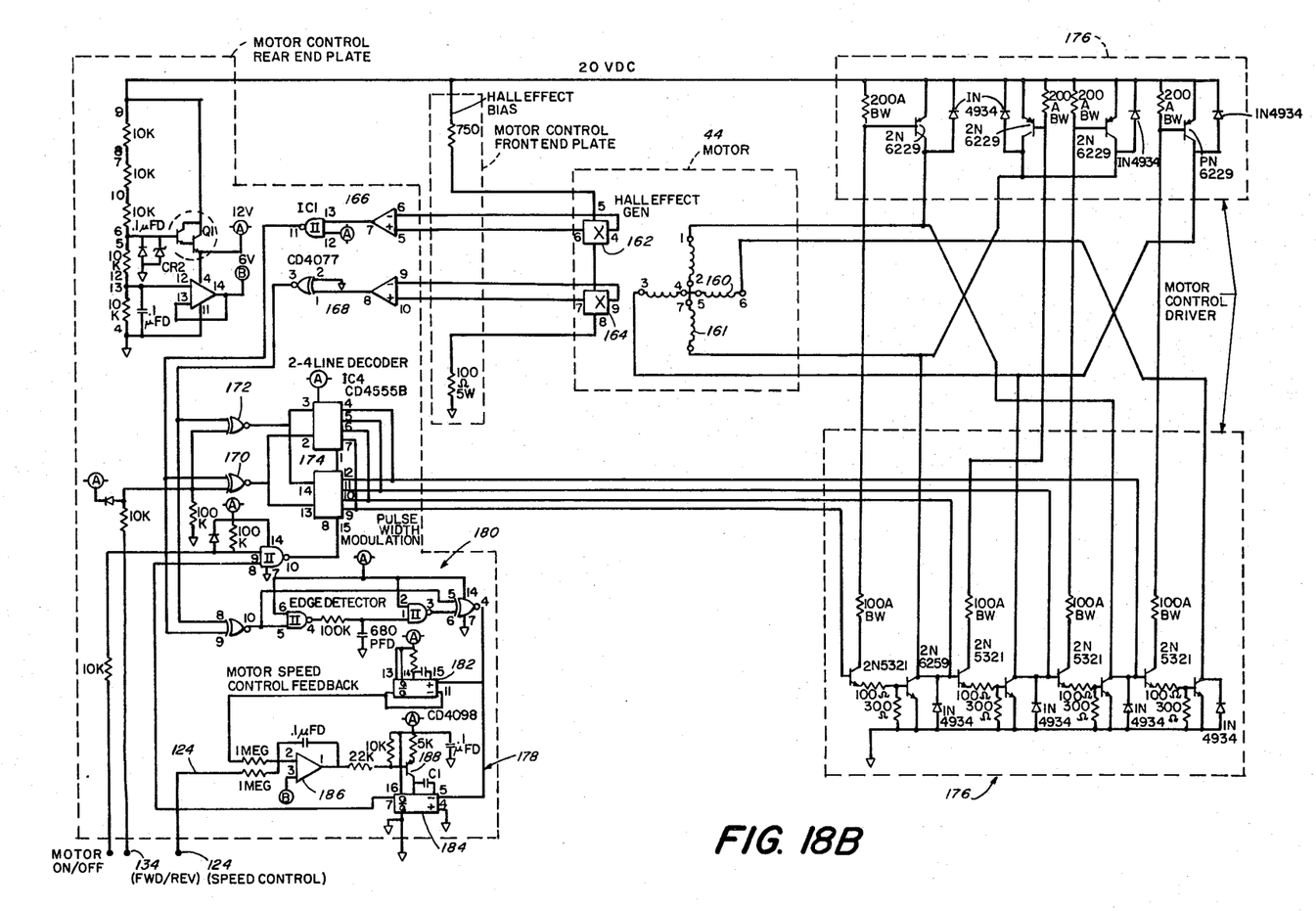

The control and motor drive electronics 42 and 46 are shown in simplified schematics in FIGS. 15 and 16 and in detail in FIG. 18. The detailed schematic of FIG. 18 provides rough resistance values and the like which can be adjusted for optimum circuit design.

The temperature control electronics shown in FIG. 15 is responsive to the input from the thermistor T1 on the cold plate and the thermistor T2 on the radiator. Thermistor T1 is connected to a bridge circuit 118 and the bridge output is amplified in an amplifier 120. The output 122 of that amplifier is an indication of the temperature difference between the temperature set point and the measured temperature of the cold plate. This temperature error signal is applied through resistor R1 to a speed control output 124. A minimum value for that output is provided by a clamp circuit 126 which includes a zener diode 128 in series with resistor R2 between the power supply and ground. The diode D1 permits the speed output to rise above that minimum speed with increased temperature. This minimum output for the speed control keeps the pump moving at a slow rate in both the forward and reverse directions to prevent freezing of the flowing coolant as already noted.

The temperature error signal 122 is also provided to the negative inputs of comparators 130 and 132. When the temperature error signal in line 122 drops below the voltage reference provided to comparator 130, the comparator output switches high to provide a motor reverse indication on line 134. Similarly, when the temperature error signal on line 122 drops below the lower reference level provided to comparator 132, a high output is provided on line 136 to turn on the cold plate heater 48. Each of the comparators 130 and 132 is designed to provide hysteresis in the output relative to the input for switching at respective temperatures $T_r$, $T_f$ and $T_{min}$, $T_{off}$. Once a comparator switches high a higher input is required to switch it low.

The thermistor $T_2$ is connected into a bridge circuit 138. When the radiator temperature drops such that the voltage applied to the negative input of a comparator 140 reaches some predetermined level, the output to line 141 will switch low. Line 141 is connected to the negative input of a comparator 142. If the comparator 142 has not been disabled by logic circuitry to be discussed, the low level indicating a very low temperature on the radiator turns the radiator heater 51 on.

As already discussed, to avoid waste of power, the heater 51 is not turned on unless the control circuitry anticipates that the pump is about to switch to the forward direction and the radiator is at a predetermined low temperature. The latter condition is determined by the signal on line 141. Logic circuitry including diodes D2 and D3 is provided at the plus input to comparator 142 to disable that comparator unless the motor is in reverse and is about to switch to forward. To that end the output 134 from the forward/reverse comparator 130 is applied through diode D2 to the comparator 142. If the pump is running in the forward direction, the output on line 134 is low and that low output disables the comparator 142. The comparator is also disabled by diode D3 if the temperature on the cold plate, as sensed by thermistor T1, is not at least as high as temperature $T_{rh}$ (FIG. 5). If the temperature of the cold plate is less than $T_{rh}$, the output of the comparator 144 is low and the comparator 142 is disabled.

The motor drive electronics 46 are shown in the simplified schematic of FIG. 16. The motor 44 is operated as a DC brushless motor in which two pairs of stator windings 160 and 161 are energized sequentially to cause rotation of a permanent magnet rotor. For example, if the windings are energized sequentially across the junctions a-b, c-d, b-a and d-c, the rotor rotates in one direction; and if the sequence is reversed, the motor direction reverses. The speed of the motor is dependent upon the DC level and duty cycle of the driving current to the windings. Rather than a commutator with brushes, two Hall effect devices 162 and 164 sense the position of the rotor and thus provide for synchronization of the drives for the individual windings.

With the present circuit, the Hall-effect devices 162 and 164, located on the motor assembly, provide quadrature signals to squaring circuits 166 and 168. The quadrature square wave outputs from those circuits are applied through exclusive OR gates 170 and 172 to a binary decoder. The exclusive OR gates 170 and 172 provide for motor reversal by means of a direction control signal 134' taken from output 134 in the temperature control circuit.

The two-to-four line decoder 174, if continuously enabled, provides pulses of duration T sequentially to the four output leads. Those pulses are applied through a current steering circuit 176 to the stator windings 160 and 161. In a motor cycle four pulses are applied to the two windings in the sequence necessary for forward or reverse rotation of the motor. With the decoder continuously enabled, the pulses provide for maximum speed of the device for a given pulse amplitude.

To provide for speed control, the decoder output is enabled by a synchronized signal on line 178. By enabling the decoder during only a portion of each time period T, the duty cycle and thus the average value of the signal applied to each coil is reduced. This pulse width modulation is determined by the circuit beginning with the edge detector 180. The edge detector 180 provides a series of impulses at time intervals T to two monostable multivibrators, or one-shots, 182 and 184. The Q output of one-shot 184 is applied to the decoder as the pulse modulation signal.

It can be seen that the edge detector 180 provides for a synchronized firing of the one-shot. The pulse duration of one-shot 184 is determined by the circuit which includes one-shot 182. The output of one-shot 182 can be considered a tachometer signal because the average value is indicative of speed. That output is algebraically summed with the speed control signal 124' taken from the output 124 of the temperature control circuit of FIG. 15. This summed signal is applied through an integrator 186 to a PNP transistor 188. With the emitter resistor R5, the transistor 188 acts as a current source to charge the capacitor C1 and thus determine the pulse width of the one-shot 184.

It can be seen that with the motor at a standstill, there is no output from the edge detector 180. The one-shot does not fire and the $\overline{Q}$ output remains high. That high output on line 178 enables the decoder 174 continuously so that maximum power input is applied to the stator windings 160 and 161. As the motor starts to rotate under that high power input, the rate of the edge detector output increases. With the speed still fairly slow, the $\overline{Q}$ output of one-shot 182 remains high for a large portion of each cycle; it is only triggered low for a short period d with each impulse from the edge detector 180. Also, assuming the speed control signal to be disconnected, the integrator provides a fairly low output to the transistor 188. This results in large current flow through that transistor for guick charging of the capacitor C1 and a short duration Q output of the one-shot 184, or a long duration $\overline{Q}$ output.

Figure 17:
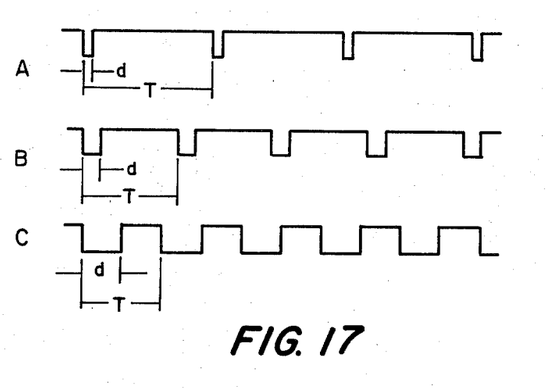
FIG. 17 is a timing chart of the motor drive signal for increasing motor speed.

As shown in FIG. 17A, with the short Q output over a period d, the $\overline{Q}$ output is still high during most of the time period T; thus the duty cycle of the driving current applied to the stator windings is still high. As can be seen in FIGS. 17B and 17C, as the speed of the motor continues to increase, the rate of firing of the one-shot 184 also increases so that it is continuously synchronized with the signals applied to the decoder 174. With that increasing rate of firing of the edge detector, however, the $\overline{Q}$ output of one-shot 182 begins to decrease in duration, and the integrator output begins to increase. That increase reduces the current flow through transistor 188 and thus reduces the charging rate of capacitor C1. This in turn results in a longer pulse time d on the Q output of one-shot 184, seen in FIGS. 17B and 17C as a decrease in the enabling pulse width line on 178.

The enable signal on line 178 can be seen to provide a delayed enabling of decoder 174 during each time period T with increased pump speed. The speed of the motor continues to increase until the pulse widths from the decoder 174 are reduced sufficiently by the delayed enable to stop the acceleration. The motor then tends to hold a constant speed with a constant pulse width for a fixed shaft load. By changing the signal on speed control 184', the pulse width of the decoder enable signal 178 and thus the speed at which the motor is stabilized is changed.

The pulse width also changes in response to a change in shaft load so as to maintain a controlled speed.

It can be seen from the above that by means of the circuit shown in FIG. 16 each stator winding is energized by a single pulse during each energizing time frame. The length of that pulse is decreased with increasing motor speed to energize the windings to a predetermined motor speed. It should be noted that, because the decoder 174 is fully enabled when no impulses are received from the edge detector 180, a synchronization signal to the one-shot 184 is not necessary for starting the motor. The Hall-effect signal does provide a quadrature signal to the decoder 174 to energize the proper winding.

Because only a single pulse is used during each energizing time frame, the AC component of the energizing current is much less than that of conventional pulse width energization circuits, thus increasing the efficiency of the circuit and motor.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A thermal control system associated with a payload in a space shuttle including a liquid flowing in a liquid loop and in heat exchange relationship with the payload and with a heat sink or source, the system comprising:
   a variable speed pump for driving the liquid through the loop, the pump being energized in response to the temperature of the load and increased pump speed providing for increased heat transfer between the payload and the heat source or sink, the heat sink or source being a payload-mounted or pallet-mounted radiator or being thermally connected to a shuttle thermal control loop.

2. A thermal control system as claimed in claim 1 wherein the pump is a reversible pump, the system further including check valves associated with the heat source or sink such that reversal of liquid flow causes by-passing of the heat source or sink through the check valves.

3. A thermal control system as claimed in claim 2 wherein the pump speed, in both forward and reverse directions, is maintained at or above a predetermined minimum pump speed.

4. A thermal control system as claimed in claim 2 in which a heat sink provides for cooling of the load, the system further comprising a heat source associated with the liquid control loop for providing heat to the liquid when reverse flow bypasses the heat sink.

5. A thermal control system as claimed in claim 1 wherein the heat source or sink is a pay-load-mounted or pallet-mounted radiator.

6. A thermal control system as claimed in claim 5 wherein the radiator includes at least one heat pipe for transferring heat from the liquid loop to a radiating surface.

7. A thermal control system as claimed in claim 6 wherein the heat pipe is seated in an elongated, high thermal conductivity extrusion and is held in place by an elongated, retaining member.

8. A thermal control system as claimed in claim 7 wherein the retaining member is a spring clamp.

9. A thermal control system as claimed in claim 1, 2 or 5 wherein the pump is mounted to a cold plate in heat exchange relationship with the load.

10. A thermal control system as claimed in claim 1, 2 or 5 in which the liquid pump is mounted separately from the load and the liquid is directed to the load through a disconnectable liquid coupling.

11. A thermal control system as claimed in claim 1, 2 or 5 further comprising a magnetic coupling between the liquid pump and its drive motor.

12. A thermal control system as claimed in claim 1, 2 or 5 further comprising a thermal isolator between the liquid pump and its drive motor.

13. A thermal control system as claimed in claim 1, 2 or 5 further including a motor control circuit for controlling a DC brushless motor to drive the pump, the control circuit comprising:
   means for developing a binary signal synchronized with the rotation of the motor;
   a digital decoder circuit for decoding the binary signal and sequentially providing drive pulses to the motor windings, a single pulse being applied to each winding during each energizing time frame; and
   means for modulating the pulse widths of the pulses from the decoder to provide motor speed.

14. A thermal control system as claimed in claim 13 wherein the means for pulse width modulating the drive pulses comprises:
   a monostable multivibrator fired in synchronization with the decoder output, the multivibrator providing for a maximum pulse width when the multivibrator is not fired; and
   means for varying the pulse width of the multivibrator output such that the drive pulses from the decoder are decreased with an increased motor speed.

15. A thermal control system as claimed in claim 14 wherein:
   the means for varying the pulse width of the multivibrator output includes an integrator responsive to a motor speed signal and a speed control signal.

16. A payload thermal control system for controlling the temperature of a payload in a space shuttle, the shuttle having a shuttle thermal control loop which is in heat exchange relationship with a shuttle thermal radiator and with shuttle heat stations available to serve as heat sources or sinks to payloads, the system comprising:
   a liquid flow loop other than the shuttle thermal control loop in heat exchange relationship with the payload and with a shuttle heat station or a payload-mounted or payload-pallet-mounted radiator; and
   a liquid pump for driving the liquid in the liquid flow loop.

17. A thermal control system as claimed in claim 16 wherein the pump is a variable speed pump, the speed control of which is responsive to the temperature of the payload.

18. A thermal control system as claimed in claim 17 wherein the liquid pump is reversible, the system further comprising check valves for by-passing the radiator when the motor is reversed.

19. A thermal control system as claimed in claim 18 wherein the pump speed, in both forward and reverse directions, is maintained at or above a predetermined minimum pump speed.

20. A thermal control system as claimed in claim 16, 17 or 18 wherein the pump is mounted to a cold plate in heat exchange relationship with the load.

21. A thermal control system as claimed in claim 16, 17 or 18 in which the liquid pump is mounted separately from the load and the liquid is directed to the load through a disconnectable liquid coupling.

22. A payload thermal control system as claimed in claim 16 wherein said liquid flow loop is in heat exchange relationship with a payload-mounted or payload-pallet-mounted thermal radiator.

23. A thermal control system including a liquid flowing in a liquid loop and in heat exchange relationship with a load and with a heat sink or source, the liquid being driven through the loop by a liquid pump, the system characterized in that:
   the pump is a reversible pump and the system further includes check valves associated with the heat sink or source such that reversal of liquid flow causes bypassing of the heat sink or source through the check valves.

24. A thermal control system as claimed in claim 23 wherein the pump speed, in both forward and reverse directions, is maintained at or above a predetermined minimum pump speed.

25. A thermal control system as claimed in claim 23 in which a heat sink provides for cooling of the load, the system further comprising a heat source associated with the liquid control loop for providing heat to the liquid when reverse flow by-passes the heat sink.

26. A thermal control system as claimed in claim 23 further including a motor control circuit for controlling a DC brushless motor to drive the pump, the control circuit comprising:
   means for developing a binary signal synchronized with the rotation of the motor;
   a digital decoder circuit for decoding the binary signal and sequentially providing drive pulses to the motor windings, a single pulse being applied to each winding during each energizing time frame; and
   means for modulating the pulse widths of the pulses from the decoder to provide motor speed.

27. A thermal control system as claimed in claim 26 wherein the means for pulse width modulating the drive pulses comprises:
   a monostable multivibrator fired in synchronization with the decoder output, the multivibrator providing for a maximum pulse width when the multivibrator is not fired; and
   means for varying the pulse width of the multivibrator output such that the drive pulses from the decoder are decreased with an increased motor speed.

28. A thermal control system as claimed in claim 27 wherein:
   the means for varying the pulse width of the multivibrator output includes an integrator responsive to a motor speed signal and a speed control signal.

29. A thermal control system including a liquid flowing in a liquid loop and in heat exchange relationship with a load and with a heat sink or source, the liquid being driven through the loop by a liquid pump, the system characterized in that:
   the pump is mounted to a cold plate in heat exchange relationship with the load.

30. A thermal control system as claimed in claim 16, 23 or 29, wherein the liquid pump is a variable speed pump.

31. A thermal control system including a liquid flowing in a liquid loop and in heat exchange relationship with a load and with a heat sink or source, and a variable speed pump for driving the liquid through the loop, the pump being energized in response to the temperature of the load and increased pump speed providing for increased heat transfer between the load and the heat sink or source, characterized in that the liquid pump is driven by a DC brushless motor, the motor control circuit comprising:
   means for developing a binary signal synchronized with the rotation of the motor;
   a digital decoder circuit for decoding the binary signal and sequentially providing drive pulses to the motor windings, a single pulse being applied to each winding during each energizing time frame; and
   means for modulating the pulse widths of the pulses from the decoder to provide motor speed.

32. A thermal control system as claimed in claim 31 wherein the means for pulse width modulating the drive pulses comprises:
   a monostable multivibrator fired in synchronization with the decoder output; and
   means for varying the pulse width of the multivibrator output such that the drive pulses from the decoder are decreased with an increased motor speed.

33. A thermal control system as claimed in claim 32 wherein:
   the means for varying the pulse width of the multivibrator output includes an integrator responsive to a motor speed signal and a speed control signal.

* * * * *

UNITED STATES PATENT AND TRADEMARK OFFICE
CERTIFICATE OF CORRECTION

PATENT NO. : 4,388,964

DATED : June 21, 1983

INVENTOR(S) : David W. Almgren, John T. Bartoszek, Robert M. Lucas
Richard P. Berthiaume, Richard H. Spencer, William H. Saia It is certified that error appears in the above—identified patent and that said Letters Patent is hereby corrected as shown below:

Column 3, line 17, "taken along line 13-13" should be deleted.
Column 4, line 56, "transistor" should be ---transfer---.

Signed and Sealed this

Twenty-fifth Day of October 1983

[SEAL]

Attest:

GERALD J. MOSSINGHOFF

Attesting Officer  Commissioner of Patents and Trademarks